UNITED STATES PATENT OFFICE.

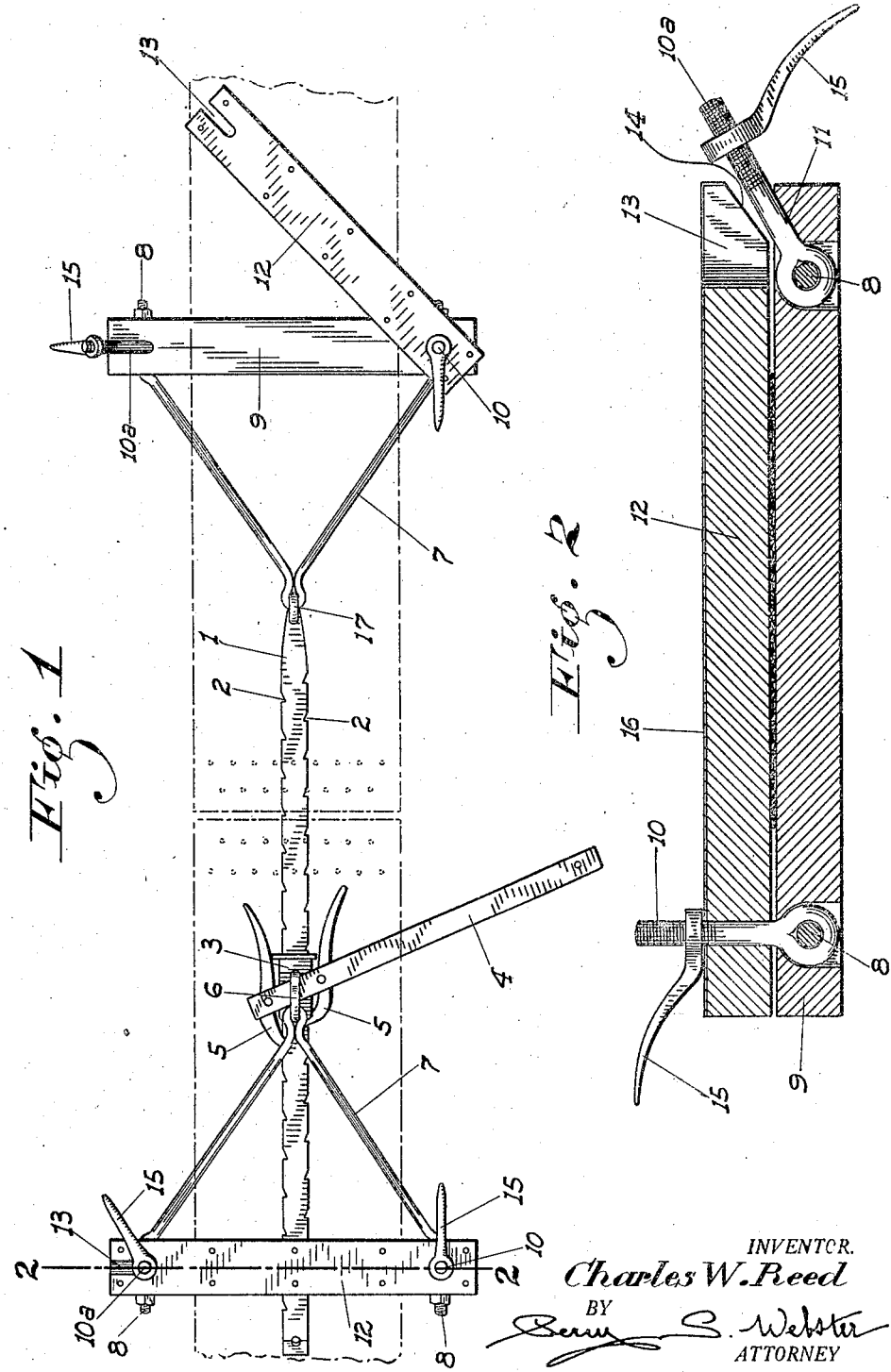

CHARLES W. REED, OF MODESTO, CALIFORNIA, ASSIGNOR TO BENNIE J. REED, OF MODESTO, CALIFORNIA.

BELT STRETCHER AND CLAMP.

1,299,227.  Specification of Letters Patent.  Patented Apr. 1, 1919.

Application filed August 17, 1918. Serial No. 250,359.

*To all whom it may concern:*

Be it known that I, CHARLES W. REED, a citizen of the United States of America, residing at Modesto, in the county of Stanislaus, State of Californa, have invented certain new and useful Improvements in Belt Stretchers and Clamps; and I do declare the following to be a clear, full, and exact description of the same, reference being had to the accompanying drawings, and to the characters of reference marked thereon, which form a part of this application.

This invention relates to belt stretchers and clamps, particularly for use with belts of the type used in transmitting power in machine shops, factories, etc., the principal object being to produce a stretcher and clamp which may be applied to the belt without removing the same from its pulleys in order to tighten and hold it in position while relacing.

Another object is to produce such a device as will be a complete unit in itself, with no parts to assemble and with no removable members to become mislaid.

A further object is to provide a device which may quickly and easily be applied and operated by one man, and which will maintain the clamped ends of the belt substantially on a plane one with the other.

A still further object of the invention is to produce a simple and inexpensive device and yet one which will be exceedingly effective for the purposes for which it is designed.

These objects, I accomplish by means of such structure and relative arrangement of the parts as will fully appear by a perusal of the following specification and claims.

On the drawings, similar characters of reference indicate corresponding parts in the several views.

Figure 1 is a top plan view of the complete device.

Fig. 2 is an end section through one of the clamps taken on a line 2—2 of Fig. 1.

Referring now more particularly to the characters of reference on the drawings, the numeral 1 designates the stretcher bar of any desired length which is provided with a plurality of notches 2 cut into each edge in staggered relation.

Slidable on the bar is a sleeve 3 on which is fulcrumed a lever 4. Dogs 5 are pivotally mounted to the lever, one on either side of the sleeve and adapted to engage with the notches 2. An eye 6 is secured to or formed with the sleeve through which passes a rod 7, formed in the shape of a V, with the apex thereof in the eye 6. The outer ends 8 of the V-shaped rod are bent parallel to each other, and pass through the lower bar 9 of a clamp in which are seated a pair of eye bolts 10 and 10ª, through which the ends 8 also pass. The bar 9 is provided with a groove 11 extending outwardly and at an angle from the seat of the bolt 10ª, in order that the bolt may be turned on the rod 8 into the groove and rest in the position shown in Fig. 2. The bolt 10, however, is always maintained in a rigid vertical position.

Turnable on the vertically positioned bolt 10 is the upper clamping bar 12, of the same shape and size as the lower bar, and provided at its opposite end with an open ended slot 13 adapted to receive the bolt 10ª therein. The under side of this end is cut away as at 14 to permit the upper member of the clamp being turned on the bolt 10 and past the inclined bolt 10ª without the necessity of raising the bar 12 to clear the bolt.

The eye bolts are provided with hand nuts 15 to clamp the bars 9 and 12 firmly together. These bars are of course sufficiently rigid so that they will not bend or warp between the clamping bolts, and if made of wood the upper bar is provided with a metal sheathing 16 to protect the same and prevent the hand nuts from cutting into the wood.

The upper ends of the bolts are headed over once the hand nuts are on, as it is never necessary to entirely remove them, and this prevents their being taken off and mislaid. A similar clamping unit is pivotally swung from an eye 17 on the opposite end of the bar 1.

It is to be understood that I am aware that the stretcher member here shown is old, and I do not claim any novelty therefor as such; this type being used in combination with my improved clamps for the reason that it was the one best suited for my purpose.

The operation is as follows: The clamping units are first set the required distance apart by manipulating the stretcher dogs.

The hand nuts on the bolts 10 are loosened, and the hand nuts on the bolts 10ª retracted sufficiently to permit the same to pass over the ends of the bars 12. These bars are then swung on the bolts 10 and the device is positioned under the belt to be operated upon. The bars 12 are then swung back into position and firmly clamped down by means of the hand nuts. The lever 4 is then operated to work the sleeve 3 along the bar 1 to tighten and stretch the belt. When suitably stretched, the overlapping end may be cut off and the belt laced. The ends of the belt will be kept on a level by reason of their resting on the bar 1 and the V-shaped rods 7, the tautness of the device preventing any sag.

From the foregoing description it will readily be seen that I have produced such a device as substantially fulfils the objects of the invention as set forth herein.

While this specification sets forth in detail the present and preferred construction of the device, still in practice, such deviations from such detail may be resorted to as do not form a departure from the spirit of the invention, as defined by the appended claims.

Having thus described my invention, what I claim as new and useful and desire to secure by Letters Patent is:—

1. A belt stretcher and clamp comprising the combination with a stretcher having a pawl and ratchet lever-actuated movement, of a pair of clamps, one being swivelly mounted to the stretcher bar and the other swivelly mounted to the movable member of the stretcher, each clamp including upper and lower bars, a bolt at one end rigidly secured in the lower bar and projecting through the upper bar, the same being turnable on the bolt, a bolt swivelly mounted in the other end of the lower bar whereby the bolt may be inclined at an angle, the upper bar being provided with an open ended slot for the passage of the bolt therethrough, and hand nuts on the bolts adapted to impinge against the top surface of the upper bar, whereby a belt placed between the bars may be securely clamped.

2. A belt clamp and stretcher comprising a pair of clamping members, each clamping member including a V-shaped rod, one of said rods being swivelly connected at its apex to a stretcher bar and the other rod similarly connected to the movable member of the stretcher, a lower clamping bar, an eye bolt seated in each end of the bar, the ends of the V-shaped rod being parallel and passing through the bar and the eyes of the bolts therein, an upper bar turnably mounted on one of said bolts, a slot in the other end of the upper bar, the lower bar being provided with a recess inclining from the seat of the bolt at that end whereby the same may rest at an angle and the slot end of the upper bar being cut away on its under surface to permit of the bar passing over the inclined bolt, and hand nuts on the bolts adapted to clamp the two clamping bars together.

In testimony whereof I affix my signature in presence of two witnesses.

CHARLES W. REED.

Witnesses:
 HENRY LITT,
 I. G. RHODES.